Jan. 7, 1969    C. H. DISTENFELD    3,420,999
THERMOLUMINESCENT TISSUE EQUIVALENT DOSIMETER
Filed May 11, 1966    Sheet 1 of 3
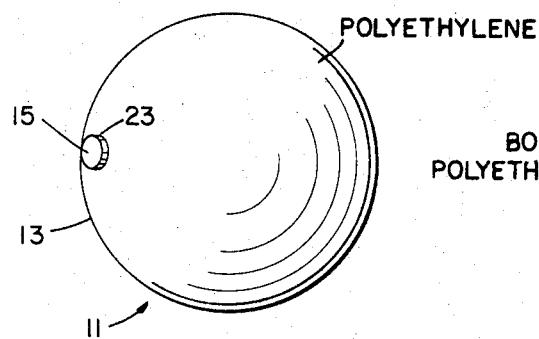
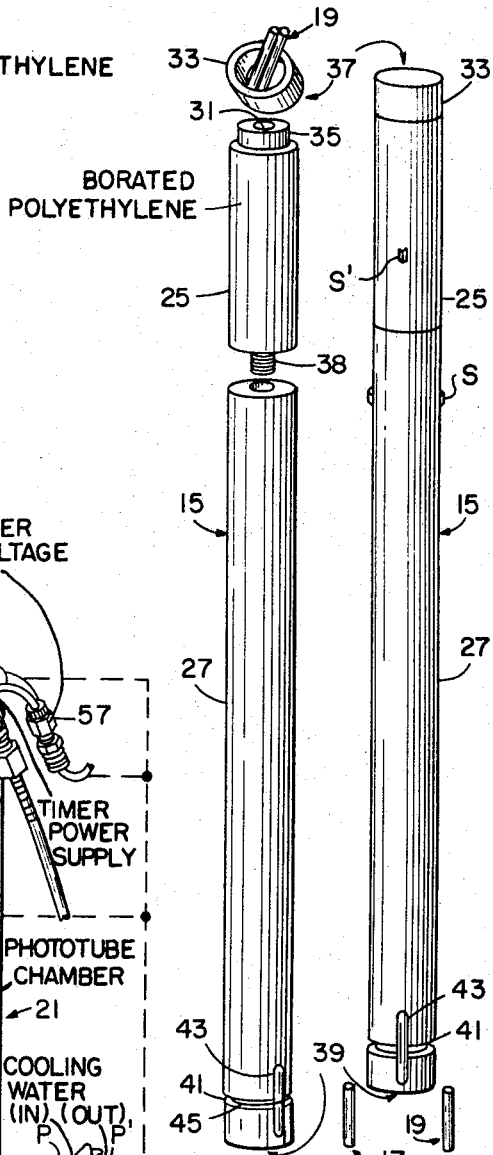
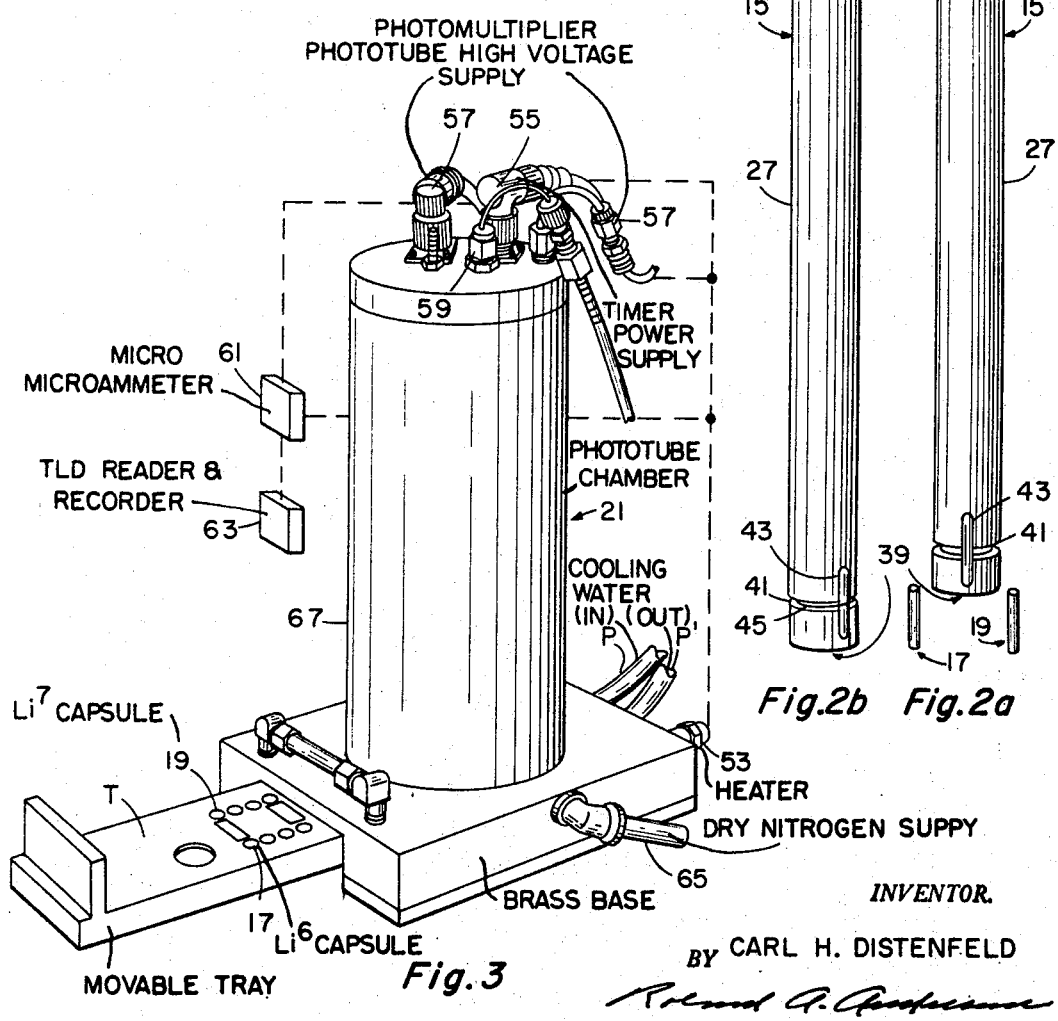
INVENTOR.
BY CARL H. DISTENFELD Jan. 7, 1969  C. H. DISTENFELD  3,420,999
THERMOLUMINESCENT TISSUE EQUIVALENT DOSIMETER
Filed May 11, 1966  Sheet 3 of 3

INVENTOR.
CARL H. DISTENFELD
BY

United States Patent Office 3,420,999
Patented Jan. 7, 1969

3,420,999
THERMOLUMINESCENT TISSUE
EQUIVALENT DOSIMETER
Carl H. Distenfeld, Mattituck, N.Y., assignor to the United
States of America as represented by the United States
Atomic Energy Commission
Filed May 11, 1966, Ser. No. 550,089
U.S. Cl. 250—83.1                                        2 Claims
Int. Cl. G01n *21/16;* G01n *21/38*

ABSTRACT OF THE DISCLOSURE

Integrating dosimeter system in which gamma ray sensitive and neutron sensitive, integrating, thermoluminescent materials are shielded by and spaced from polyethylene to provide radiation equivalent man monitoring of mixed field radition flux. Also, specific apparatus is provided for automatic remote operation in which separate gamma ray sensitive, integrating, thermoluminescent materials are separately shielded by borated and unborated polyethylene to distinguish between thermal and high energy gamma rays.

---

This invention delates to neutron tissue equivalent dosimeters for mixed field radiation and more particularly to a thermoluminescent tissue equivalent dosimeter employing means for providing gamma ray neutron discrimination. This invention was made in the course of, or under a contract with the United States Atomic Energy Commission.

In the field of high energy accelerators, it is often desirable to provide a low cost, remote, integrating, neutron, tissue equivalent dosimeter for mixed field radiation in areas of high electrical noise. Various proposals have been made and used to accomplish such dosimetry, comprising the use of phosphate or other glass microdosimeters, wherein characteristic color intensities or threshold colors were developed as a result of different dosages. While these arrangements have been useful and can accomplish the desired determination, they have not been sensitive to low dosages or capable of accuracies greater than about 20–30% of the dose equivalent tissue exposures. Additionally, it has been advantageous to provide a broad band range of neutron energy and dosage response allowing for dosimetry in chronic or low level, acute or single dose, and accidental or single high dose exposure levels. Also, it has been desirable to provide compact dosage retention for long periods of time, ease of evaluation and direct radiation equivalent man (rem) responding properties, thus to overcome the problems of the threshold detectors known heretofore.

In accordance with this invention, there are provided method and apparatus for the dosimetry of a broad band of neutron energies and mixed field dosages produced by accelerating devices operating in the multiple bev. range, such as the Alternating Gradient Synchroton at the Brookhaven National Laboratory. The method and construction involved in this invention utilizes standard and well known techniques, apparatus and materials and are highly flexible for a wide range of applications, energies, mixed-fields, dosages and dosage retentions. More particularly, this invention contemplates neutron dosimetry employing lithium-7 fluoride and lithium-6 fluoride to permit gamma-neutron discrimination. In one embodiment, there is provided a polyethylene sphere forming a hole therein, a polyethylene rod that is selectively insertable in said hole and formed with longitudinally first and second spaced grooves therein, gamma sensitive lithium-7 fluoride capsules having a neutron screening means in the first grooves near the surface of the sphere and lithium-6 and lithium-7 fluoride capsules in the second grooves near the center of the sphere. With the proper capsules, location, screening and evaluation techniques the desired dosimetry and monitoring are achieved.

It is thus an object of this invention to provide simple, economical and practical apparatus and method for the retention and analysis of neutron effects in mixed radiation fields by providing dissimilar materials that selectively discriminate between neutrons and other radiation;

It is a further object to provide neutron detection and/or neutron screening and gamma ray detection;

It is a further object to provide for the foolproof assembly and use of neutron detectors, discriminators and monitors in remote areas of high electrical noise;

It is another object to provide compact, easily operable means for accurately and continuously monitoring and detecting a broad range of tissue equivalent neutron exposures;

The above and further objects and novel features of this invention will appear more fully from the following detailed description when the same is read in connection with the accompanying drawings. It is expressly understood, however, that the drawings are not intended as a definition of the invention but are for the purpose of illustration only.

In the drawings where like elements are referenced alike:

FIGURE 1 is a partial three-dimensional view of the dosimeter apparatus of this invention;

FIGURE 2a is a partial three-dimensional assembly view of the insert rod and dissimilar dosimeter capsules for the apparatus of FIG. 1;

FIGURE 2b is a partial exploded view of the apparatus of FIG. 2a;

FIGURE 3 is a partial three-dimensional view of the thermoluminescent analysis means for the apparatus of FIG. 1;

FIGURE 4 is a graphic illustration of the amps, I vs the dose in R of high $Co^{60}$ dose response of TLD–100, TLD–600 and TLD–700 materials for the capsules of FIG. 2a;

FIGURE 5 is a graphic illustration of amps, I vs dose R in roentgens of low $Co^{60}$ dose response TLD–100 material in a capsule of FIG. 2a;

Figure 4:
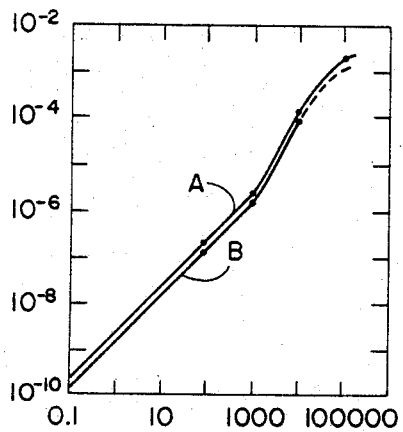

Referring now to FIGURES 1–3, the dosimeter 11 of this invention is useful in integrating the neutrons radiated from the targeting apparatus in the Brookhaven AGS. This invention, however, is useful for neutron detection 11 in any area that is confined, remote or that has high electrical noise or mixed radiation fields, such as neutrons and gamma-rays or neutrons, gamma rays and muons.

Dosimeter 11, comprises a sphere 13, rod 15, first neutron sensitive capsules 17 on the rod 15 and second gamma sensitive capsules 19 also on the rod 15. Means 21 for analyzing the thermoluminescent light output from the capsules, also processes the capsule for reuse in sphere 13.

Polyethylene sphere 13 has an axial well 23 therein extending from the outside of the sphere axially inwardly to just pass the center thereof. This spherical polyethylene equally moderates the mixed radiation impinging thereon from all directions, this moderation closely approximating or corresponding to the moderation of biological tissue whereby the dosimeter of this invention accurately monitors the neutrons impinging thereon with accurate tissue equivalent response at the center of the sphere 13.

Referring to FIGURES 2a and 2b, rod 15 comprises first and second sections 25 and 27, which are adapted to contain integrating capsules 17 and 19 that respond differently to different forms of radiation in a mixed radiation field. Rod section 25, which is adapted to fit in well 23 adjacent to the outside of sphere 13, screens out thermal or slow neutrons and is adapted to contain capsules 19 that are insensitive to fast neutrons while being sensitive to gamma rays. To this end rod section 25 comprises borated polyethylene and forms a hole 31 accommodating one or more tandemly arranged capsules 19 made of lithium-7 fluoride radio thermoluminescent material. One advantageous material is the Harshaw Co. type 700 radio phosphor made from Li material containing 99.99% $Li^7$. Cap 33 force fits over plug 35 to hold these capsules 19 in rod section 25 at end 37 thereof for long dosage retention.

Rod section 27, which threadably engages rod section 25 on threads 38 to space ends 37 and 39 in opposite directions from each other, has a smaller outer diameter than the bottom portion of well 23 and rod section 25, which has a larger OD than the bottom portion of well 23, whereby rod section 27 slips into well 23 and inserts all the way therein while rod section 25 cannot be so inserted. Rod section 27 forms a first annular groove 41 around the axis of rod 15 and at least two spaced grooves 43 at right angles thereto extending longitudinally along the outside of rod section 27. Rubber band 45 holds capsules 17 and 19 in these latter grooves respectively while groove 41 holds the rubber band 45 from slipping along rod section 27. The capsules 17 and 19 in rod section 27 in sphere 13 at its center advantageously integrate both fast and thermal or slow neutrons whose speed has been moderated by polyethylene sphere 13. To this end rod section 27 slips all the way into the bottom of well 23 and contains lithium-6 and lithium-7 fluoride radio thermoluminescent capsules 17 and 19. These respective capsules are Li containing capsules made with 95.62% $Li^6$ and 99.91% $Li^7$. Suitable capsules are available in type 600 and 700 phosphors from the Harshaw Company, containing at least 95% $Li^6$ and 99% $Li^7$.

Advantageously, rigid segregation maintains the handling tools and elements of dosimeter 11 against contamination. The phosphor itself never comes into contact with anything other than stainless steel, platinum or chromium while suitable covers guard against release of the phosphor or contamination thereof when not in use. To this end a calibrated dipper deposits 40 milligrams of the phosphor in a funnel top and a built-in vibrator shakes any residual phosphor into the sample capsule container C, which is held by one of three loading fingers of a Mettler balance and capsule loading system.

After use, the phosphor is transferred to a ½" preweighed stainless steel planchet, the samples are accurately weighed, their glow curves are recorded and their thermoluminescent dosimeter (TLD) peaks are read on a digital volt meter for inscription on the glow curve, wherein the peaks correspond to the incident neutron and gamma radiation respectively that impinged on the various capsules 17 and 19 when they are assembled in dosimeter 11.

To this end the system of FIG. 3, comprises a movable tray T for moving the samples in and out of analyzer 21. This analyzer has a heater 53, power supply and timer 55, photomultiplier phototube and high voltage supply 57, digital voltmeter 59, micro-microammeter 61 and TLD reader and recorder 63. Pipe 65 circulates dry nitrogen to both the phototube chamber 67 and the heater cavity 53. Water at 50° F. circulates through brass base 69 by way of pipes P and P' for cooling.

In operation the capsules 17 and 19 are suitably placed in and around rod 15, the rod is placed in sphere 13 and the sphere 13 is placed in the mixed radiation field containing neutrons and gamma rays with or without muons. The TLD 600 and 700 phosphors provide the described $Li^6$ and $Li^7$ respectively. TLD 100 natural Li thermoluminescent phosphor capsules and micro-glass capsules may also be used respectively at the surface and at the center of sphere 13. The TLD 100 has a lesser responce to neutrons than TLD 600 for huge neutron dosages. The micro glass can be used near the surface of the sphere 13 for gamma response above 100,000 r. The lithium-7 capsules have a response up to 50,000 r.

Figure 5:
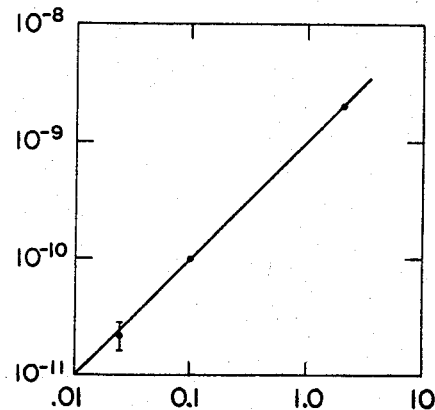
Figure 6:
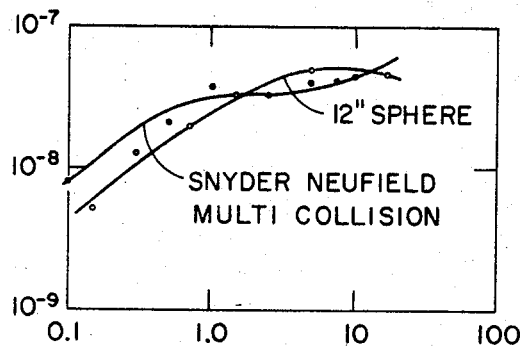
FIGURE 6 is a graphic illustration of rem/n/cm.$^2$ vs $E_n$ mev. for 12″ sphere apparatus of FIG. 1 and Snyder-Neufeld multi-collision calculation showing a characteristic response of LiF phosphor in a 12″ polyethylene moderating sphere.

After exposing the integrating capsules 19 of this invention to radiation they are removed and placed in photo-tube chamber 67 whereupon heater 53 causes the capsules 19 to produce light corresponding to their individual characteristic radiation exposures, which are detected by photo tubes 57 and recorded on recorder 63. To this end the thermoluminescence causes the photomultiplier tubes in chamber 67 to produce current flow which produces a peaked glow curve in the recorder. The peak of this glow curve, minus the dark current of the photomultiplier and the pre-luminescence of the capsules corresponds to the radiation dosage to the capsule. This dosage is calibrated against a cobalt 60 source exposure to the capsules normalized to 40 milligrams of phosphor. Referring to FIGURE 4, it will be seen that TLD 600 and 700 phosphors, i.e. lithium 6 and 7 phosphors, have identical gamma response and their curves A and B respectively, have a slope of plus one to 1000 r. FIGURE 5 extends the downward with standard deviation limits of 25 mr. and 100 mr.

The neutron sensitivity of TLD 600, exposed in a 12" sphere 13, is due mainly to moderated fast neutrons. Farben center production in the 600 phosphor is caused by electrons from gamma ray interactions and alpha particles from $Li^6$ $(N,\alpha)H^3$. The thermal neutron cross section for this reaction is about 940 barns dropping to less than one barn for cross sections considered over an energy interval of 10 kev. to 15 mev.

TLD 700 only undergoes an $(N,\gamma)$ interaction with a 0.033 barn cross section. The thermal neutron response of TLD 700 is the sum of the $(N,\gamma)$ response and the effect of any $Li^6$ contamination, which is so small as to account for a maximum error of only about one part per ten thousand, can be neglected in the practical dosimeter of this invention.

The fast neutron sensitivity of TLD 600 to a PuBe neutron source is about 6%. By shielding the TLD 600 and 700 capsules in borated polyethylene the following results were obtained:

TABLE I

In general:

$$\text{TLD } 600 = N_{f_1} + N_t - \gamma \quad (1)$$

$$\text{TLD } 700 = N_f + 0.001 N_t + \gamma \quad (2)$$

For this case, $N_t = 0$ giving:

$$\text{TLD } 600 = N_{f_1} + \gamma \quad (3)$$

$$\text{TLD } 700 = N_f + \gamma \quad (4)$$

Where:
$N_t$ = thermal neutron response of TLD 600
$N_{f_1}$ = fast neutron response of TLD 600
$N_f$ = fast neutron response of TLD 700
$\gamma$ = gamma response of both phosphors The gamma component of the PuBe source was calculated to be about 12% of the total kerma. The phosphors, located in the sphere 13, are sensitive to this gamma component attenuated and built up by absorption in polyethylene. Neutron absorption causes a second gamma component which corresponds with the depth dose curves of the NBS Handbook 63. Knowing the total gamma fraction, the general equations given above are evaluated as follows:

$$N_f = 6$$
$$N_t = 92 \qquad N_t^1 = 27$$
$$\gamma = 2 \qquad \gamma = 73$$

TLD 600=100      TLD 700=100

Figure 7:
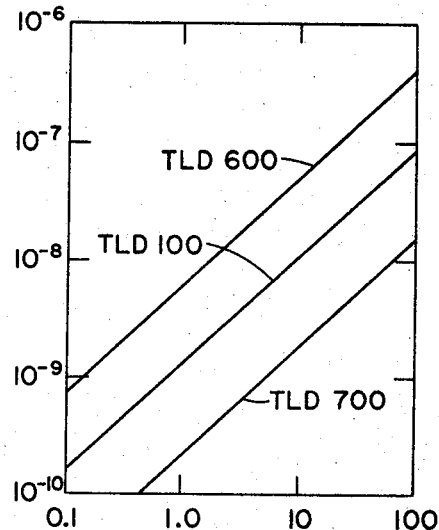
FIGURE 7 is a graphic illustration of amps, I vs dose in rem showing Pu-Be neutron dose response of TLD–100, 600 and 700 phosphors.

To evaluate the unknown radiation field, integrated by the dosimeter of this invention, such as around the BNL AGS, the response of the TLD 700 in the sphere center is subtracted from that of the TLD 600 in the sphere center. The difference is due to and indicates the neutron exposure. To this end the exposed phosphors are evaluated e.g., in correspondence with FIGURE 7 upon analysis in apparatus 21.

Considering the general equations, approximately 75% of the response of the TLD 700 is due to gamma rays. For this reason the dose reported by the TLD 700 is overestimated by about 25% and the neutron component is overestimated by only 0.5%. It is noted that the gamma energy response characteristics of TLD 600 and 700 are so similar that gamma spectra need not be considered when evaluating the neutron exposure by taking the difference between the TLD 600 and 700 capsules 17 and 19 in the center of sphere 13.

Figure 8:
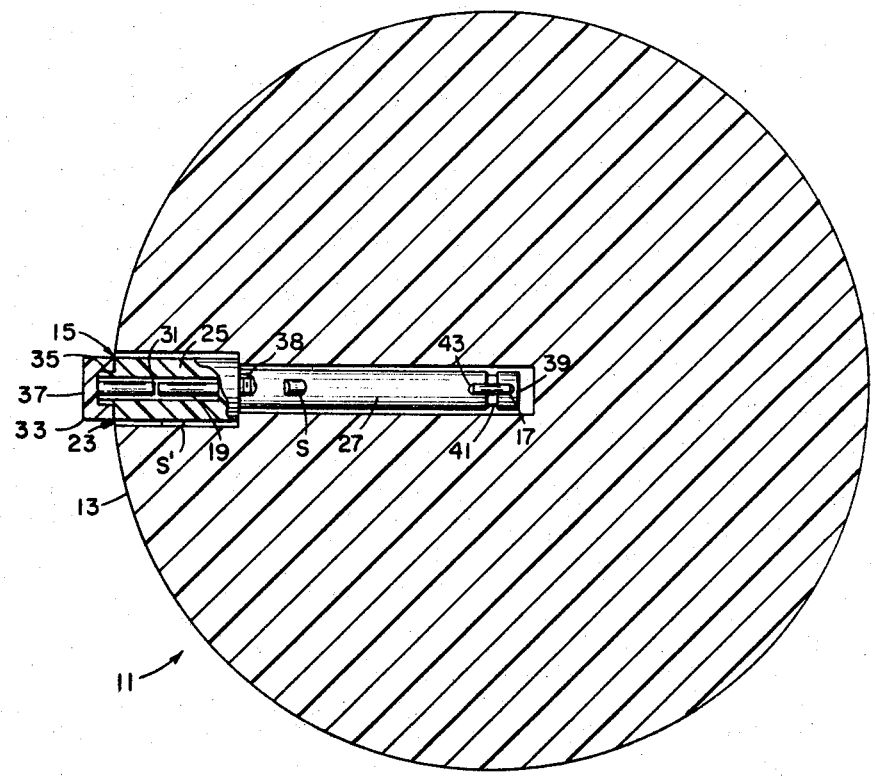
FIG. 8 is a partial cross-section of the assembly of FIG. 1.

In actual integrating tests a series of 100 milligram PuBe neutron exposures and various $Co^{60}$ gamma doses ranging from 0 −3000 mr. were performed. The net reading obtained by taking simple differences between the TLD 600 and TLD 700 capsules 17 and 19 at the sphere center correctly indicated the 100 millirem neutron exposure in the presence of the 3000 mr. $Co^{60}$ exposure. The TLD 700 phosphor contained in the borated polyethylene dosimeter holder section 25 correctly reported the 3000 mr. gamma exposure. Further successful tests were made with the Oak Ridge Health Physics Research Reactor and the system response corresponded closely against known reactor exposure with dosages from 1000 to 1500 rem in three timed power runs and in two bursts. The space between the gamma dosimeter holder 15 and the moderating sphere 13 substantially attenuates captured gamma rays in the sphere 13 from interfering with the gamma dosimeter capsules 17 and 19. To this end advantageously only small spaced shoulders S and S' near the middle of the rod 15 touch the inside of the narrow and wide respective stepped portions of well 23 corresponding in length to sections 25 and 27 of rod 15. This structure will be clearly understood from the above, and is shown for ease of explanation in FIG. 8.

This invention provides an economic, compact and practical integrating tissue equivalent dosimeter for neutrons in a mixed radiation field. Moreover, this invention provides neutron-gamma discrimination and accurate neutron sensitivity over a broad band of neutron energies and dosages allowing for dosimetry in chronic, acute and accidental dose exposure levels. This invention moreover provides dosage retention for long periods of time, direct radiation equivalent man-responding properties, easy evaluation and remote operation in areas of high electrical noise.

What is claimed is:

1. Low cost integrating dosimeter apparatus (11), comprising:
   (a) a cylindrical, first rod section (25) of borated polyethylene extending longitudinally along a first axis and having a uniform first diameter terminated at one end by threads (38) of a second diameter and at the opposite end by a first cylindrical portion (35) having a third diameter less than said first diameter and forming a hole (31) for receiving first capsule means (19) containing gamma ray sensitive, integrating, fast neutron insensitive, thermoluminescent material (Li-7 fluoride);
   (b) cylindrical means (33) of borated polyethylene formed with an outside diameter equal to said first diameter and having a closed end (37) and in inner cylindrical receiving portion that frictionally mates with said first cylindrical portion (35) to close said hole (31) selectively to hold said first capsule means (19) in said hole (31);
   (c) a longitudinally extending, cylindrical, second rod section (27) of polyethylene having an axis coinciding with said first axis, an outside fourth diameter smaller than said first diameter and larger than said second diameter, an end for receiving said threads (38) to connect said rod sections (25 and 27) along the same axis, and opposite end means (39) shaped with an annular array of exterior grooves (43) extending co-axially around the axis of said second rod section (27) for receiving a set of capsule means (17 and 19) respectively containing integrating gamma rays sensitive, fast neutron insensitive, and integrating neutron sensitive, thermoluminescent materials (Li-6 and Li-7 fluoride); and
   (d) a polyethylene sphere (13) forming a round, stepped cross-section well (23) having an anterior portion with a larger diameter than said first diameter and a posterior portion with a smaller diameter than said first diameter and larger than said fourth diameter, and extending into said sphere below said anterior portion of said well (23) along an axis coinciding with axis of said anterior portion of said well (23) to the center of said sphere (13) for receiving said second rod section (27) posterior to said first rod section (25), said rod sections (25 and 27) having small raised portions (S' and S) for centering said first rod section (25) in said anterior portion of said well (23) and said second rod section (27) in said posterior portion of said well (23) to form a space between said rod sections (25 and 27) and the portions of said well (23) thereabout while said set of capsules means (17 and 19) are selectively held adjacent the center of said sphere (13) and said first capsule means (19) is selectively held adjacent the outside of said sphere (13).

2. A dosimeter method for neutrons in a mixed field radiation flux, comprising exposing first lithium-7 fluoride and second, lithium-6 fluoride thermoluminescent capsules to said flux while shielding said capsules substantially equally with polyethylene whereby the thermoluminescence of said first capsules subtracted from the thermoluminescence of said second capsule provides direct radiation equivalent man-neutron response with accuracy and long retention over a broad range of neutron dosages and over a wide spectrum of neutron energies.

References Cited
UNITED STATES PATENTS

| | | | |
|---|---|---|---|
| 3,129,329 | 4/1964 | Love et al. | 250—83.1 |
| 3,176,133 | 3/1965 | McCall et al. | 250—71.5 |
| 3,300,643 | 1/1967 | McCall | 250—71.5 |

RALPH G. NILSON, *Primary Examiner.*

A. B. CROFT, *Assistant Examiner.*

U.S. Cl. X.R.

250—71